United States Patent
Sato et al.

(10) Patent No.: US 7,906,578 B2
(45) Date of Patent: Mar. 15, 2011

(54) ROOM-TEMPERATURE-CURABLE COMPOSITION

(75) Inventors: Isao Sato, Kamisu (JP); Yoshitaka Sunayama, Kamisu (JP); Genichirou Enna, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/143,033

(22) Filed: Jun. 20, 2008

(65) Prior Publication Data

US 2008/0262143 A1 Oct. 23, 2008

Related U.S. Application Data

(63) Continuation of application No. PCT/JP2006/325288, filed on Dec. 19, 2006.

(30) Foreign Application Priority Data

Dec. 20, 2005 (JP) .................. 2005-365764

(51) Int. Cl.
*C08L 57/02* (2006.01)
(52) U.S. Cl. .............. 524/500; 525/403; 525/474
(58) Field of Classification Search .............. 524/547
See application file for complete search history.

(56) References Cited

U.S. PATENT DOCUMENTS

| | | | |
|---|---|---|---|
| 6,207,766 B1 * | 3/2001 | Doi et al. ............ | 525/403 |
| 6,780,934 B2 | 8/2004 | Doi et al. | |
| 2003/0105261 A1 * | 6/2003 | Komitsu et al. ............ | 528/10 |

FOREIGN PATENT DOCUMENTS

| | | |
|---|---|---|
| CN | 1668698 A | 9/2005 |
| EP | 0 372 561 A2 | 6/1990 |
| JP | 58-10418 | 2/1983 |
| JP | 10-245484 | 9/1998 |
| JP | 10-251552 | 9/1998 |
| JP | 2001-323151 | 11/2001 |
| JP | 2005-213446 | 8/2005 |
| JP | 2006-63335 | 3/2006 |
| WO | WO 98/47939 A1 | 10/1998 |

OTHER PUBLICATIONS

U.S. Appl. No. 09/694,501, filed Oct. 24, 2000, Doi, et al.
U.S. Appl. No. 12/348,544, filed Jan. 5, 2009, Kimura, et al.
Office Action issued Aug. 11, 2010, in Chinese Patent Application No. 2006800474923.

* cited by examiner

*Primary Examiner* — Vasu Jagannathan
*Assistant Examiner* — Doris L Lee
(74) *Attorney, Agent, or Firm* — Oblon, Spivak, McClelland, Maier & Neustadt, L.L.P.

(57) ABSTRACT

To provide a room-temperature-curable composition which comprises an oxyalkylene polymer containing hydrolyzable silicon groups, which has ensured working time and curing rate required for operation, and which can provide a cured article having good tensile properties.

A room-temperature-curable composition comprising a polymer (a1) and a curing catalyst (b), wherein the polymer (a1) is a linear oxyalkylene polymer having at least two hydrolyzable silicon groups of the formula (1), at different molecular terminals:

$$-Si(OR)_3 \qquad (1)$$

wherein each R independently represents a $C_{1-6}$ organic group.

23 Claims, No Drawings

ROOM-TEMPERATURE-CURABLE COMPOSITION

TECHNICAL FIELD

The present invention relates to a room-temperature-curable composition which will be cured by a cross-linking reaction of hydrolyzable silicon groups in the presence of moisture.

BACKGROUND ART

An oxyalkylene polymer having hydrolyzable silicon groups at molecular terminals, has moisture-curable properties, and it is used for applications as e.g. a covering composition and a sealing composition, by exploiting a characteristic such that the cured product has rubber elasticity.

As the above hydrolyzable silicon groups, groups selected from the group consisting of methyl dimethoxysilyl groups and trimethoxysilyl groups, are usually used.

Among such oxyalkylene polymers having hydrolyzable silicon groups, when a polymer having a methyldimethoxysilyl groups as hydrolyzable silicon groups, was used for a room-temperature-curable composition, a cured product obtained by curing the composition had elongation and flexibility, but there was a problem such that the curing rate of the curable composition was not sufficient when a high curing rate was needed (For example, Patent Document 1).

It is known that with respect to a polymer having trimethoxysilyl groups as hydrolyzable groups, the trimethoxysilyl groups tend to be easily hydrolyzed, and cross-links by siloxane bonds tend to be easily formed, whereby it is possible to provide an elastic body by quick curing, in the presence of moisture (For example, Patent Document 2 or 3).

However, when the polymer having trimethoxysilyl groups was used alone, a curable composition to be obtained usually had a remarkably high curing rate even at room temperature (for example, 23° C.), whereby it tended to be difficult to secure working time.

In the above case, in order to have a high strength, it is common to use a method of using a polyoxyalkylene having at least one hydrolyzable silicon group in one molecule obtained by using a polyoxypropylene triol as a raw material. However, in such a case, a high strength may be obtained, but there were limits in the elongation and elastic modulus after curing by moisture.

Patent Document 1: JP-B-58-10418
Patent Document 2: JP-A-3-47825 (EP372561)
Patent Document 3: JP-A-10-245484

DISCLOSURE OF THE INVENTION

Object to be Accomplished by the Invention

With respect to a composition employing an oxyalkylene polymer having trialkoxysilyl groups, it was found that when a linear oxyalkylene polymer was used, it was possible to improve the elongation, while maintaining the strength, as compared with the oxyalkylene polymer having a branch produced by using e.g. a polyoxypropylene triol as a raw material.

Namely, the present invention provides a room-temperature-curable composition as described above, which has ensured working time and curing time required for operation, and which has an improved elongation after curing, while maintaining the strength.

Means to Accomplish the Object

The present invention has been made to accomplish the above object, and specifically, it provides the following.

(1) A room-temperature-curable composition comprising a polymer (a1) and a curing catalyst (b), wherein the polymer (a1) is a linear oxyalkylene polymer having at least two hydrolyzable silicon groups of the formula (1), at different molecular terminals:

wherein each R independently represents a $C_{1-6}$ organic group.

(2) The room-temperature-curable composition according to the above (1), wherein the above two hydrolyzable silicon groups are a trimethoxysilyl group and a trialkoxysilyl group having a $C_{2-6}$ alkoxy group.

(3) The room-temperature-curable composition according to the above (1) or (2), wherein the above polymer (a1) is a polymer obtained by using, as a raw material, a polyoxyalkylene diol obtained by ring-opening addition polymerization of a cyclic ether by means of a double metal cyanide complex catalyst in the presence of a bifunctional initiator, and introducing hydrolyzable silicon groups to molecular terminals of the diol.

(4) The room-temperature-curable composition according to any one of the above (1) to (3), wherein the above polymer (a1) has a number average molecular weight (Mn) of from 8,000 to 50,000 and a molecular weight distribution (Mw/Mn) of at most 1.6.

(5) The room-temperature-curable composition according to any one of the above (1) to (4), which comprises the above polymer (a1), a filler, an adhesion-promoting agent and a plasticizer.

(6) A room-temperature-curable composition comprising a polymer (a2), a polymer (a3) and a curing catalyst (b), wherein the polymer (a2) is a linear oxyalkylene polymer having one type of at least one hydrolyzable silicon group of the formula (1), at molecular terminals, and the polymer (a3) is a linear oxyalkylene polymer having at least one hydrolyzable silicon group of the formula (1), which is different in type from the group of the polymer (a2), at molecular terminals:

wherein each R independently represents a $C_{1-6}$ organic group.

(7) The room-temperature-curable composition as defined in the above (6), wherein the above hydrolyzable silicon groups are a trimethoxysilyl group and a trialkoxysilyl group having a $C_{2-6}$ alkoxy group.

(8) The room-temperature-curable composition according to the above (6) or (7), wherein the above polymer (a2) and the above polymer (a3) are polymers obtained by using, as a raw material, a polyoxyalkylene diol obtained by ring-opening polymerization of a cyclic ether by means of a double metal cyanide complex catalyst in the presence of a bifunctional initiator, and by introducing hydrolyzable silicon groups to molecular terminals of the diol.

(9) The room-temperature-curable composition according to any one of the above (6) to (8) wherein the above polymer (a2) and the above polymer (a3) have a number average molecular weight (Mn) of from 8,000 to 50,000 and a molecular weight distribution (Mw/Mn) of at most 1.6.

(10) The room-temperature-curable composition according to any one of the above (6) to (9), which comprises the above polymer (a2), the above polymer (a3), a filler, an adhesion-promoting agent and a plasticizer.

Effects of the Invention

The curable composition of the present invention is a room-temperature-curable composition having ensured working time and curing time at room temperature, and having suitable elongation.

Specifically, when a linear oxyalkylene polymer having trimethoxysilyl groups and trialkoxyl groups having $C_{2-6}$ alkoxyl groups, as the above hydrolyzable silicon groups, is used, it is possible to obtain a room-temperature-curable composition which has a sufficiently long working time and a high curing rate of the curable composition, and which is capable of providing a cured product having a high strength and a large elongation.

BEST MODE FOR CARRYING OUT THE INVENTION

The room-temperature-curable composition (hereinafter referred to simply as the curable composition) of the present invention comprises a polymer (polymers (a1) to (a3)) having specific hydrolyzable silicon groups and a catalyst. If necessary, other additives, such as additives selected from e.g. an adhesion-promoting agent, a plasticizer, a dehydrating agent, a filler, an age resistor and a coloring agent, may be suitably added and mixed to obtain the curable composition. Such a curable composition provides a cured product by cross-linking of the oxyalkylene polymer having hydrolyzable silicon groups by hydrolysis and cross-linking reactions of the hydrolyzable silicon groups, by moisture in the air under a room temperature condition.

Now, materials such as oxyalkylene polymers having hydrolyzable silicon groups, used for the curable composition of the present invention, will be described in details.

Polymers (a1) to (a3)

The above oxyalkylene polymers (a1) to (a3) are preferably polymers obtained by using, as a raw material, a polyoxyalkylene diol obtained by ring-opening addition polymerization of a cyclic ether by means of a polymerization catalyst in the presence of a bifunctional initiator, and introducing hydrolyzable silicon groups to molecular terminals of the diol. Or, the raw material may be a polyoxyalkylene monool obtained by using an unsaturated monoalcohol such as allyl alcohol, as an initiator, instead of the bifunctional initiator.

As the above initiator, a compound having two active hydrogen atoms in one molecule, may be used, and especially, it is preferably a hydroxyl compound and/or an unsaturated alcohol, having two hydroxyl groups in one molecule, particularly preferably a hydroxyl compound having two hydroxyl groups in one molecule.

The above hydroxyl compound having two hydroxyl groups in one molecule may, for example, be ethylene glycol, propylene glycol, dipropylene glycol, butane diol, hexamethylene glycol, hydrogenated bisphenol A, neopentyl glycol, polybutadiene glycol, diethylene glycol, triethylene glycol or polyethylene glycol, or a hydroxyl group-containing compound such as an alkylene oxide adduct of such a compound.

The above unsaturated alcohol may, for example, be allyl alcohol or methallyl alcohol.

The above initiators may be used alone or in combination as a mixture of two or more of them.

The above cyclic ether may, for example, be ethylene oxide, propylene oxide, butylene oxide, hexylene oxide or tetrahydrofuran. Especially, propylene oxide is preferred.

Such cyclic ethers may be used alone or in combination as a mixture of two or more of them.

Characteristics of a cured product obtained by curing the oxyalkylene polymer having hydrolyzable silicon groups, may vary depending on the number of hydrolyzable silicon groups per one molecule of the polymer, the molecular weight of the polymer per one molecular terminal, and various parameters such as the molecular weight distribution of the polymer. In order to improve the elongation characteristic and release characteristic after curing, which is the object of the present invention, it is preferred to use polyoxypropylene diol as a raw material for the oxyalkylene polymer.

Polymerization Catalyst

The above polymerization catalyst may, for example, be a potassium compound such as potassium hydroxide or potassium methoxide, an alkali metal compound such as a cesium compound such as cesium hydroxide, a double metal cyanide complex, a metalloporphyrin complex or a compound having a P=N bond.

Among such catalysts, it is particularly preferred to use a catalyst selected from the group consisting of a double metal cyanide complex, a cesium compound and a compound having a P=N bond, since an oxyalkylene polymer having a large molecular weight will thereby be obtained.

As the above double metal cyanide complex, a complex having zinc hexacyanocobaltate as the main component is preferred, since the complex has a high polymerization activity, and especially, its ether and/or its alcohol complex is preferred, from the viewpoint of particularly high activity.

As the above ether, ethylene glycol dimethyl ether (hereinafter referred to also as glyme) or diethylene glycol dimethyl ether (hereinafter referred to as diglyme), is preferred, and it is particularly preferred to use glyme, since its complex is easy to handle during the production. Further, when an alcohol is used as a ligand, it is particularly preferred to use t-butanol, since a high active catalyst will thereby be obtained.

The amount of the double metal cyanide complex to be used is preferably from 0.0001 to 0.1 mass %, further preferably from 0.001 to 0.03 mass %, based on the polymer obtained, since storage stability of the product will be excellent, and such is economically favorable.

As the above cesium compound, it is possible to use a compound selected from e.g. cesium metal, cesium hydroxide, cesium carbonate or cesium alkoxide such as cesium methoxide. Especially, it is preferred to use cesium hydroxide from the viewpoint of availability.

The amount of the cesium compound to be used is preferably from 0.05 to 1.5 mass %, further preferably from 0.1 to 1.0 mass %, based on a polymer to be obtained.

As the above compound having a P=N bond, it is possible to use at least one compound selected from the group consisting of a phosphazenium compound, a phosphazene compound and a phosphine oxide compound. Especially, the phosphazene compound and the phosphine oxide compound are preferred, from the viewpoint of availability.

Hydrolyzable Silicon Groups

The oxyalkylene polymer having hydrolyzable silicon groups used for the room-temperature-curable resin composition of the present invention, may be the following.

One is a polymer (a1) which is a linear oxyalkylene polymer having at least two types of hydrolyzable silicon groups of the formula (1), at different molecular terminals.

Another is a mixture comprising a polymer (a2) and a polymer (a3), wherein the polymer (a2) is a linear oxyalkylene polymer having one type of at least one hydrolyzable silicon group of the formula (1), at molecular terminals, and the polymer (a3) is a linear oxyalkylene polymer having at least one hydrolyzable silicon group of the formula (1), which is different in type from the group of the polymer (a2), at molecular terminals:

$$—Si(OR)_3 \quad (1)$$

wherein each R independently represents a $C_{1-6}$ organic group.

R in the above formula is a $C_{1-6}$ organic group, for example, an alkyl group, an alkenyl group, an alkynyl group, a cycloalkyl group, a cycloalkenyl group or a phenyl group, and it is preferably a $C_{1-6}$ alkyl group.

That is, OR in the formula (1) may, for example, be an alkoxy group such as a methoxy group, an ethoxy group, a propoxy group, a butoxy group, a pentyloxy group or a n-hexyloxy group; an alkenyloxy group such as a vinyloxy group, a propenyloxy group, an allyloxy group or an isopropenyloxy group; a cycloalkyloxy group such as a cyclopentyloxy group or a cyclohexyloxy group; or a phenoxy group. Among them, it is preferably an alkoxy group such as a methoxy group, an ethoxy group, a propoxy group, a butoxy group, a pentyloxy group or a n-hexyloxy group.

Further, in the present invention, at least two types of hydrolyzable silyl groups are used. A combination of such hydrolyzable silyl groups is not particularly limited, and it is possible to use the above mentioned combination of the hydrolyzable silyl groups. The combination is preferably a combination of a trimethoxysilyl group with another hydrolyzable silyl group, further preferably a combination of a trimethoxysilyl group with a triethoxysilyl group.

In the present invention, it is acceptable as long as at least two types of hydrolyzable silicon groups of the above formula (1) are contained in the oxyalkylene polymer having hydrolyzable silicon groups.

That is, as the oxyalkylene polymer having hydrolyzable silicon groups, the following two modes are mentioned.

One is a mode of using, as the oxyalkylene polymer having a hydrolyzable silicon group, an oxyalkylene polymer having two types of hydrolyzable silicon groups in one molecule. That is a mode of using the polymer (a1).

Another is a mode of using, as the oxyalkylene polymer having hydrolyzable silicon groups, a mixture comprising at least two types of oxyalkylene polymers including an oxyalkylene polymer having one type of at least one hydrolyzable silicon group, and an oxyalkylene polymer having at least one hydrolyzable silicon group, which is different in type from the group of the other polymer. That is, a mode of using a mixture of the polymers (a2) and (a3).

In the above second mode, the polymer (a3) is preferably a polymer having at least one hydrolyzable silicon group of the formula (1), which is a group different from the group of the polymer (a2). In such a case, by changing the mixing proportions of the polymer (a2) and the polymer (a3), it is possible to easily change the contained proportions of the varied hydrolyzable silicon groups in the room-temperature-curable resin composition, and it is possible to easily adjust working time and curing time of the room-temperature-curable composition.

Between such two modes, the second mode is preferred, since it is easy to change the proportions of varied hydrolyzable silicon groups.

Introduction of Hydrolyzable Silicon Groups

A method to introduce the above hydrolyzable silicon groups, is not particularly limited, and usually, a production is carried out as follows.

By ring-opening polymerization of a cyclic ether compound in the presence of a bifunctional initiator, a polyoxyalkylene diol is produced. By using the diol as a raw material, and introducing hydrolyzable silicon groups to hydroxyl groups in the diol, it is possible to produce a polymer having hydrolyzable silicon groups. Further, when the following method (1) is used, it is possible to use, as a raw material, a polyoxyalkylene monool obtained by using an unsaturated monoalcohol such as allyl alcohol, as an initiator.

The oxyalkylene polymer having hydrolyzable silicon groups, which is obtained by introducing hydrolyzable silicon groups to a polyoxyalkylene diol, has molecular terminals having a structure of the following formula (2):

$$—R^0—Si(OR)_3 \quad (2)$$

wherein $R^0$ represents a divalent organic group, and R is the same R as in the above formula (1).

The following methods (I) to (III) may, for example, be mentioned as methods to introduce hydrolyzable silicon groups to a raw material oxyalkylene polymer, through the organic group $R^0$, as mentioned above.

(I) A method wherein unsaturated organic groups are introduced to the hydroxyl groups of an oxyalkylene polymer having terminal hydroxyl groups such as a polyoxyalkylene diol or a polyoxyalkylene monool having a terminal unsaturated group, and then, hydrolyzable silicon groups are introduced to the unsaturated organic group.

As the above method (I), the following two methods (I-1) and (I-2) may be exemplified.

The method to introduce unsaturated organic groups to functional groups of the oxyalkylene polymer having terminal hydroxyl groups, may be a method wherein the oxyalkylene polymer having terminal hydroxyl groups is reacted with a reactant having both an unsaturated group and a functional group which may bond with hydroxyl groups of the oxyalkylene polymer having terminal hydroxyl groups by an ether bond, an ester bond, an urethane bond or a carbonate bond.

(I-1) A method of using a so-called hydrosilyl-forming reaction wherein the unsaturated organic groups are reacted with a hydrosilyl compound of the following formula (3):

$$Si(OR)_3 \quad (3)$$

wherein R is the same R as in the above formula (1).

The hydrosilyl-forming reaction is a reaction wherein to the unsaturated organic groups introduced to the oxyalkylene polymer having terminal hydroxyl groups, a hydrosilyl compound is added, in the presence of a catalyst selected from the group consisting of e.g. a platinum type catalyst, a rhodium type catalyst, a cobalt type catalyst, a paradium type catalyst or a nickel type catalyst. The catalyst is preferably a platinum type catalyst such as a chloroplatinic acid, platinum metal, a chloroplatinate, or a platinum olefin complex.

The above hydrosilyl-forming reaction is preferably carried out at a temperature of from 30 to 150° C., more preferably carried out at a temperature of from 60 to 120° C.

The reaction time of the above hydrosilyl-forming reaction is usually a few hours.

(I-2) A method wherein the unsaturated organic groups are reacted with a mercaptosilane compound of the following formula (4):

$$(OR)_3Si—R^0—SH \quad (4)$$

wherein R is the same R as in the above formula (1). $R^0$ represents a divalent organic group, and it is preferably a divalent hydrocarbon group having from 1 to 17 carbon atoms, particularly preferably a trimethylene group ($—CH_2CH_2CH_2—$).

As the mercaptosilane compound of the above formula (4), γ-mercaptopropyltrimethoxysilane or γ-mercaptopropyltriethoxysilane may, for example, be mentioned.

When the above unsaturated organic groups are reacted with mercapto groups, it is possible to use a compound such as a radical generator used as a radical polymerization initiator, and also it is possible to carry out the reaction by radiation or heat without using the radical polymerization initiator.

As the above radical polymerization initiator, a peroxide type, an azo type or a redox type polymerization initiator or a metal compound catalyst may, for example, be mentioned, and specifically, 2,2'-azobisisobutyronitrile, 2,2'-azobis-2-methylbutyronitrile, benzoyl peroxide, tert-alkylperoxyester, acetyl peroxide or diisopropyl peroxycarbonate may, for example, be mentioned. The reaction condition for the reaction of unsaturated groups with mercapto groups by using the radical polymerization initiator, varies by the decomposition temperature (half-life temperature) of the above radical polymerization initiator, but, usually, the reaction temperature is preferably from 20 to 200° C., further preferably from 50 to 150° C. Further, the reaction time is preferably from a few hours to tens hours.

(II) A method wherein a polyoxyalkylene diol is reacted with a compound of the following formula (5)

$(RO)_3Si—R^0—NCO$ (5)

wherein R is the same R as in the above formula (1). $R^0$ represents a divalent organic group, and it is preferably a divalent hydrocarbon group having from 1 to 17 carbon atoms, most preferably a trimethylene group.

A specific example for the compound of the above formula (5), may be an isocyanate silane type compound such as α-isocyanate methyltrimethoxysilane, α-isocyanate methyltriethoxysilane, β-isocyanate ethyltrimethoxysilane, β-isocyanate ethyltriethoxysilane, γ-isocyanate propyltrimethoxysilane, or γ-isocyanate propyltriethoxysilane. Among them, when γ-isocyanate propyltrimethoxysilane, or γ-isocyanate propyltriethoxysilane is used, the fast curing properties of a room-temperature-curable composition will be improved, and the elongation properties of the cured product will be good, such being preferred.

When the compound of the above formula (5) is used, the ratio of an isocyanate group (NCO) of the compound of the above formula (5) to hydroxyl groups (OH) of the polyoxyalkylene diol, is preferably set to be NCO/OH=0.60 to 1.20 by molar ratio, further preferably NCO/OH (molar ratio)=0.90 to 1.10, most preferably from 0.95 to 1.05, by adjusting the amount of the compound of the above formula (5) added.

If the ratio of NCO/OH is too small, there may be a situation such that the remaining OH groups may react with methoxysilyl groups, whereby the storage stability of a room-temperature-curable composition to be obtained, may be low. Therefore, if the ratio of NCO/OH is too small, it is preferred to consume excess OH groups by a reaction afresh with the compound of the above formula (5) or a monoisocyanate compound.

On the other hand, if the ratio of NCO/OH is too large, physical properties of a cured product may become hard, or foams may be formed by a reaction of water with NCO groups. Therefore, if the ratio of NCO/OH is too large, it is preferred to consume excess NCO groups by a reaction afresh with an organic compound having OH groups.

The method to use the compound of the above formula (5), has only a few production steps, whereby it is possible to drastically reduce the production time, and there is no impurity formed as a by-product during the production steps. Moreover, in the method, no intricate operation such as purification is necessary, and a room-temperature-curable composition containing an oxyalkylene polymer having hydrolyzable silicon groups, which is obtained by the method, is excellent in storage stability.

When hydroxyl groups of a polyoxyalkylene diol are to be reacted with the compound (5), it is possible to use a known catalyst for an urethane-forming reaction. The reaction temperature and the reaction condition needed until the reaction ends vary, depending on the presence or absence of the catalyst for an urethane-forming reaction, and on the amount of the catalyst to be used, and the reaction temperature is usually preferably from 20 to 200° C., further preferably from 50 to 150° C. Further, the reaction time is preferably a few hours.

When the catalyst for an urethane-forming reaction is used, the amount to be used is from 5 to 200 ppm, preferably from 10 to 100 ppm. If the amount of the catalyst for an urethane-forming reaction is too large, the storage stability of the polymer would become poor, and if the amount of the catalyst is too small, the urethane-forming reaction would take a long time or would not proceed, such being not preferred.

(III) A method wherein a polyoxyalkylene diol is reacted with a polyisocyanate compound, under a condition of excess isocyanate groups, to produce an oxyalkylene polymer having isocyanate groups at least a part of molecular terminals, and the above isocyanate groups are reacted with a group W of a silicon compound of the following formula:

$(RO)_3Si—R^0—W$ (6)

wherein R is the same R as in the above formula (1). $R^0$ represents a divalent organic group. The above $R^0$ is preferably a divalent hydrocarbon group having from 1 to 17 carbon atoms, most preferably a trimethylene group. W represents a group having an active hydrogen such as a hydroxyl group, a carboxyl group, a mercapto group, a primary amino group, or a secondary amino group.

The silicon compound of the above formula may, for example, be an aminosilane type compound such as N-phenyl-γ-aminopropyltrimethoxysilane, γ-aminopropyltrimethoxysilane, or γ-aminopropyltriethoxysilane; and a mercaptosilane type compound such as γ-mercaptopropyltrimethoxysilane.

When hydroxyl groups of a polyoxyalkylene diol are reacted with the compound of the above formula (6), it is possible to use a known catalyst for an urethane-forming reaction. The reaction temperature and the reaction condition needed until the reaction ends vary, depending on the presence or absence of the catalyst of an urethane-forming reaction, and on the amount of the catalyst to be used, and the reaction temperature is usually preferably from 20 to 200° C., further preferably from 50 to 150° C. Further, the reaction time is preferably a few hours.

The present invention is characterized by the main chain made of a linear alkylene chain, and by at least two different types of hydrolyzable silicon groups, thereby to develop a suitable curing rate and working time of a curable composition and a high peel strength and elongation properties after curing, while maintaining the tensile strength.

Specifically, the formation rate of silanol groups by hydrolysis of trimethoxysilyl groups, is extremely fast, while the rate of hydrolysis of trialkoxysilyl groups having a $C_{2-6}$ alkoxy group, is low, whereby a curable composition having both of them, is preferred because working time becomes longer while maintaining a relatively good curing rate.

Further, by using only a polyoxyalkylene polymer having a linear oxyalkylene chain as the main chain, it is possible to obtain high elongation properties and adhesion properties against peeling, after a curable composition is cured, such being preferred.

Specifically, when the polyoxyalkylene polymer having a trimethoxysilyl group and a triethoxysilyl group, and having an oxyalkylene chain as the main chain, was used as the oxyalkylene polymer having hydrolyzable silicon groups, mechanical properties such as elongation properties and peel strength of a cured product obtained by curing the curable composition will be further improved, and the balance between working time and curing rate of a room-temperature-curable composition will be excellent, such being preferred.

In the present invention, respective molar ratios of at least two types of hydrolyzable silyl groups contained in the oxyalkylene polymer having hydrolyzable silicon groups, may be properly set for adjusting e.g. the curing rate and working time of the curable composition to be obtained, or mechanical properties of a cured product after curing, in the proper ranges.

For example, when a trimethoxysilyl group and a triethoxysilyl group are used as functional groups of the oxyalkylene polymer having hydrolyzable silicon groups which has two functional groups, the molar ratio of the trimethoxysilyl group (TMS) to the triethoxysilyl group (TES), in the total polymer, is preferably TMS:TES=5:95 to 95:5.

By adjusting the ratio of TMS in the total hydrolyzable silyl groups to be at least 5 mol %, it is possible to maintain the curing rate of a curable composition to be sufficiently fast. Further, by adjusting the ratio of TMS in the total hydrolyzable silyl groups to be at most 95 mol %, it is possible to obtain a curable composition having long working time and excellent workability, and the elongation properties of the cured product to be obtained will be high.

In the present invention, the molecular weight distribution of the oxyalkylene polymer having hydrolyzable silicon groups may be adjusted to a suitable level by adjusting the type and the amount of a polymerization catalyst used for the production of the oxyalkylene polymer as a raw material, by optimizing the polymerization condition for a cyclic ether, or by using a mixture of oxyalkylene polymers having at least two types of hydrolyzable silicon groups.

In order to obtain a cured product which is flexible and has a suitable elongation, as a cured product of the curable composition, the number average molecular weight (Mn) of the oxyalkylene polymers (a1) to (a3) having hydrolyzable silicon groups, is preferably from 8,000 to 50,000, further preferably from 8,000 to 25,000, most preferably from 12,000 to 20,000. If the number average molecular weight (Mn) is lower than 8,000, a cured product to be obtained would be brittle, and if it is beyond 50,000, the polymer would have a high viscosity, and would bring about a curable composition having poor workability and handling.

The above molecular weight distribution (polystyrene-base molecular weight distribution) of the oxyalkylene polymer having hydrolyzable silicon groups, may be represented by the following formula:

Molecular weight distribution=weight average molecular weight (Mw)/number average molecular weight (Mn)

The above molecular weight distribution is preferably less than 1.6, further preferably at most 1.5, most preferably at most 1.4.

By adjusting the above molecular weight distribution of the oxyalkylene polymer having hydrolyzable silicon groups, it is possible to improve the elongation at break, and also it is possible to improve strength, while maintaining the elastic modulus of a cured product.

Further, when a curable composition using an oxyalkylene polymer having hydrolyzable silicon groups which has a small molecular weight distribution, is compared with a curable composition using an oxyalkylene polymer having hydrolyzable silicon groups which has the same number average molecular weight but a wider molecular weight distribution, the former has a smaller content of the polymer component having a small molecular weight, and the elongation at break and the maximum stress of a resulting cured product, are larger as compared with the latter. Moreover, the viscosity of the former curable composition is lower, whereby it is excellent in handling efficiency.

The oxyalkylene polymer having hydrolyzable silicon groups which has a small molecular weight distribution, can be constantly produced by polymerizing a cyclic ether in the presence of an initiator by using a double metal cyanide complex as the above polymerization catalyst, to obtain an alkylene oxide polymer having terminal functional groups, and then converting the functional groups to hydrolyzable silicon groups.

The above molecular weight distribution (Mw/Mn) may be measured by using Gel permeation chromatography (GPC).

However, even when an oxyalkylene polymer having hydrolyzable silicon groups which has the molecular weight distribution of at least 1.6, is used, the curable composition of the present invention provides a cured product having the maximum tensile stress and elongation at break improved, as compared with, for example, a curable composition using a branched polymer obtained by introducing trialkoxysilyl groups at terminals of a polyoxyalkylene triol.

Curing Catalyst (b)

In the curable composition of the present invention, a curing catalyst (b) is used in order to accelerate the hydrolysis reaction of hydrolyzable silicon groups and/or the cross-linking reaction. Specific examples may be an organic tin carboxylate such as dibutyltin diacetate, dibutyltin dilaurate, dioctyltin dilaurate, $(n\text{-}C_4H_9)_2Sn(OCOCH=CHCOOCH_3)_2$, $(n\text{-}C_4H_9)_2Sn(OCOCH=CHCOO(n\text{-}C_4H_9))_2$, $(n\text{-}C_8H_{17})_2Sn(OCOCH=CHCOOCH_3)_2$, $(n\text{-}C_8H_{17})_2Sn(OCOCH=CHCOO(n\text{-}C_4H_9))_2$, or $(n\text{-}C_8H_{17})_2Sn(OCOCH=CHCOO(iso\text{-}C_8H_{17}))_2$; a sulfur-containing organic tin compound such as $(n\text{-}C_4H_9)_2Sn(SCH_2COO)$, $(n\text{-}C_8H_{17})_2Sn(SCH_2COO)$, $(n\text{-}C_8H_{17})_2Sn(SCH_2CH_2COO)$, $(n\text{-}C_8H_{17})_2Sn\ (SCH_2COOCH_2CH_2OCOCH_2S)$, $(n\text{-}C_4H_9)_2Sn\ (SCH_2COO\ (iso\text{-}C_8H_{17}))_2$, $(n\text{-}CBH_{17})_2Sn(SCH_2COO(n\text{-}C_8H_{17})_2$ or $(n\text{-}C_4H_9)_2SnS$; an organic tin oxide such as $(n\text{-}C_4H_9)_2SnO$ or $(n\text{-}C_8H_{17})_2SnO$; a reaction product of the above organic tin oxide with an ester compound selected from the group consisting of ethyl silicate, dimethyl maleate, diethyl maleate, dioctyl maleate, dimethyl phthalate, diethyl phthalate and dioctyl phthalate, etc.; a chelate tin compound such as $(n\text{-}C_4H_9)_2Sn(acac)_2$, $(n\text{-}C_8H_{17})_2Sn(acac)_2$, $(n\text{-}C_4H_9)_2Sn(OC_8H_{17})(acac)$, $(n\text{-}C_4H_9)_2Sn(OC(CH_3)CHCO_2C_2H_5)_2$, $(n\text{-}C_8H_{17})_2Sn(OC(CH_3)CHCO_2C_2H_5)_2$ or $(n\text{-}C_4H_9)_2Sn(OC_8H_{17})(OC(CH_3)CHCO_2C_2H_5)$ (wherein the above acac represents an acetylacetonate ligand, and $OC(CH_3)CHCO_2C_2H_5$ represents an ethylacetoacetate ligand); a reaction product of the above chelate tin compound with an alkoxysilane selected from the group consisting of e.g. tetramethoxysilane, tetraethoxysilane and tetrapropoxysilane; and a tetravalent tin compound such as an organic tin compound having —SnOSn— bond such as $(n\text{-}C_4H_9)_2(CH_3COO)SnOSn(OCOCH_3)(n\text{-}C_4H_9)_2$ or $(n\text{-}C_4H_9)_2(CH_3O)SnOSn(OCH_3)(n\text{-}C_4H_9)_2$. Further, a divalent tin carboxylate such as tin 2-ethylhexanoate, tin n-octylate, tin naphthenate or tin stearate; an acidic compound such as octylic acid, phosphoric acid, p-toluenesulfonic acid or phthalic acid; an amine compound, such as an aliphatic monoamine such as butylamine, hexylamine, octylamine, decylamine or laurylamine; an aliphatic diamine such as ethylenediamine or hexanediamine; an aliphatic polyamine such as diethylenetriamine, triethylenetetramine or tetraethylenepentamine; a heterocyclic amine such as piperidine or piperazine; an aromatic amine such as meta-phenylenediamine; an alkanolamine such as monoethanolamine; diethanolamine or triethanolamine; a trialkylamine such as triethylamine; or various modified amines used as curing agents for an epoxy resin, may be mentioned. Such compounds may be used alone or in combination as a mixture of two or more of them. When two or more of them are used together, for example, it is preferred to use the above metal-containing compound such as a reaction product of the ester compound with the above divalent tin carboxylate, organic tin carboxylate or organic tin oxide, together with an aliphatic monoamine and other above amine compounds, since it is possible to obtain excellent curability.

The curing catalyst (b) is preferably used in an amount of from 0.001 to 10 parts by mass, per 100 parts by mass of the total of the oxyalkylene polymers (a1) to (a3) having hydrolyzable silicon groups (hereinafter referred to as polymer (a)). By adjusting the amount of the curing catalyst (b) to be at least 0.001 part by mass, it is possible to effectively accelerate the curing rate of the curable composition, and by adjusting it to be at most 10 parts by mass, it is possible to prevent a problem such as formation of foams, or decrease of durability.

In addition, as mentioned later, the room-temperature-curable composition of the present invention may contain curable components having hydrolyzable silicon groups, in addition to the oxyalkylene polymer (a) having hydrolyzable silicon groups. In such a case, the amount of the curing catalyst (b) to be used, is preferably in the above range per 100 parts by mass in total of the oxyalkylene polymer (a) having hydrolyzable silicon groups, and other curable components. The curable composition of the present invention may be a one-pack type wherein the curing catalyst (b) is added in advance and stored under a dehydrated condition, and the mixture is reacted with moisture in atmosphere when curing. Or, it may be a two-pack type wherein immediately before curing, the curing catalyst (b) is mixed for curing.

Other Additives

To the room-temperature-curable composition of the present invention, it is possible to add additives such as an adhesion-promoting agent, a plasticizer, a dehydrating agent, a filler, an age resistor and a coloring agent, if necessary.

Filler

To the curable composition of the present invention, it is possible to add a known filler. The filler may, for example, be a powder-form filler such as a calcium carbonate which is surface-treated with an aliphatic acid or a resin acid type organic substance, a colloidal calcium carbonate having an average particle size of at most 1 µm, wherein the above calcium carbonate is further formed into fine particles, a light calcium carbonate having an average particle size of from 1 to 3 µm which is produced by a sedimentation method, a heavy calcium carbonate having an average particle size of from 1 to 20 µm, other calcium carbonates, fumed silica, silica having a sedimentation property, silicic anhydride, silicic hydride, carbon black, magnesium carbonate, diatomaceous earth, calcined clay, clay, talc, titanium oxide, bentonite, an organic bentonite, ferric oxide, zinc oxide, active zinc white, silas balloons, glass balloons, plastic balloons, wood flour, pulp, cotton chip, mica, walnut shell flour, rice shell flour, graphite, aluminum fine powder or flint powder; a fiber-form filler such as glass fiber, glass filament, carbon fiber, Kevlar fiber or polyethylene fiber. When the filler is used, the amount to be used is preferably from 0 to 1,000 parts by mass, further preferably from 20 to 500 parts by mass, particularly preferably from 20 to 250 parts by mass, per 100 parts by mass of the oxyalkylene polymer (a) having hydrolyzable silicon groups. If the amount to be used exceeds 1,000 parts by mass, the product tends to be brittle and tends to have poor elongation. Such fillers may be used alone or in combination as a mixture of two or more of them. Moreover, by using the above plastic balloons, it is possible to lower the specific gravity of the curable composition.

Plasticizer

To the curable composition of the present invention, it is possible to add a plasticizer. As a plasticizer, it is possible to use a known plasticizer, for example, a phthalate ester such as dibutyl phthalate or butyl benzyl phthalate; an aliphatic carboxylate such as dioctyl adipate, bis(2-methylnonyl) succinate, dibutyl sebacate or butyl oleate; an alcohol ester such as pentaerythritol ester; a phosphate such as trioctyl phosphate or tricresyl phosphate; an epoxy plasticizer such as epoxidized soybean oil, dioctyl 4,5-epoxyhexahydrophthalate or benzyl epoxystearate; chlorinated paraffin; a polyester type plasticizer such as a polyester obtained by reacting a dibasic acid with a divalent alcohol; a polyether such as polyoxypropylene glycol or its derivative; a styrene type oligomer such as poly-α-methylstyrene or polystyrene; or a polymeric plasticizer such as an oligomer such as polybutadiene, a butadiene-acrylonitrile copolymer, polychloroprene, polyisoprene, polybutene, hydrogen added polybutene or epoxidized polybutadiene. When the plasticizer is used, it is preferably used in an amount of from 0 to 1,000 parts by mass, particularly preferably from 0 to 200, per 100 parts by mass of the oxyalkylene polymer (a) having hydrolyzable silicon groups. If the amount to be used, exceeds 1,000 parts by mass or more, adhesion properties will deteriorate, whereby a sufficient coagulation power may not be obtained. Such plasticizers may be used alone or in combination as a mixture of two or more of them. In addition, when the curable composition of the present invention is used for an application as e.g. an adhesive, it is preferred not to use a plasticizer, since the adhesion power between a cured product and a substrate may be increased without using the plasticizer.

Adhesion—Promoting Agent

To the curable composition of the present invention, it is possible to use an adhesion-promoting agent to improve adhesion properties to a substrate. The adhesion-promoting agent may, for example, be a compound so-called a silane coupling agent such as a silane containing (meta)acryloyloxy groups, a silane containing amino groups, a silane containing mercapto groups, a silane containing epoxy groups or a silane containing carboxyl groups.

Among them, a silane containing amino groups or a silane containing epoxy groups, is preferred.

The above silane containing amino groups may, for example, be 3-aminopropyltrimethoxysilane, 3-aminopropyltriethoxysilane, 3-aminopropylmethyldimethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, 3-ureidopropyltriethoxysilane, N—(N-vinyl benzyl-2-aminoethyl)-3-aminopropyltrimethoxysilane or 3-anilinopropyltrimethoxysilane.

The above silane containing epoxy groups may, for example, be 3-glycidyloxypropyltrimethoxysilane, 3-glycidyloxypropylmethyldimethoxysilane or 3-glycidyloxypropyltriethoxysilane.

Such adhesion-promoting agents may be used alone or in combination as a mixture of two of more of them. When is the adhesion-promoting agent is used, the amount to be used is preferably from 0 to 30 parts by mass, particularly preferably from 0.1 to 10 parts by mass, per 100 parts by mass of the oxyalkylene polymer (a) having hydrolyzable silicon groups. If the amount of the adhesion-promoting agent exceeds 30 parts by mass, the curable composition tends to be hard and tends to have only a little flexibility.

As the adhesion-promoting agent, it is possible to use an epoxy resin or a combination of an epoxy resin and a curing agent for the epoxy resin, as the case requires. Such epoxy resin is not particularly limited, and it is possible to use a commonly known epoxy resin. The epoxy resin may, for example, be a commonly used epoxy resin or a vinyl type polymer containing an epoxy group such as an uninflammable type epoxy resin such as a bisphenol A-glycidyl ether type epoxy resin, a bisphenol F-glycidyl ether type epoxy resin or a tetrabromobisphenol A-glycidyl ether type epoxy resin, a novolac type epoxy resin, a hydrogen-added bisphenol A type epoxy resin, a glycidyl ether type epoxy resin of a bisphenol A-propylene oxide adduct, a diglycidyl ester type epoxy resin such as glycidyl 4-glycidyl oxybenzoate, diglycidyl phthalate, diglycidyl tetrahydrophthalate or diglycidyl hexahydrophthalate, a m-aminophenol type epoxy resin, a diaminodiphenyl methane type epoxy resin, an urethane-modified epoxy resin, various cycloaliphatic epoxy resins, N,N-diglycidyl aniline, N,N-diglycidyl-o-toluidine, triglycidyl isocyanurate, polyalkylene glycol diglycidyl ether, glycidyl ether of polyhydric alcohol such as glycerol, or an epoxy compound of an unsaturated polymer such as a hydantoin type epoxy resin or a petroleum resin. When the epoxy resin is added to the curable composition, the amount to be added is preferably from 0 to 100 parts by mass, particularly preferably from 5 to 50 parts by mass, per 100 parts by mass of the oxyalkylene polymer (a) having hydrolyzable silicon groups. If the amount of the epoxy resin, exceeds 100 parts by mass, the cured product to be obtained may have a high degree of hardness and also a little flexibility.

The curing agent for the above epoxy resin is not particularly limited, and it is possible to use a commonly known curing agent for an epoxy resin. The curing agent for the epoxy resin may, for example, be an amine such as triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine or 2,4,6-tris(dimethylaminomethyl)phenol; a salt of the above amine; a blocked amine obtained by blocking the above amine with a ketimine compound; a polyamide resin; an imidazole; a dicyandiamide; a trifluoride boron complex compound; a carboxylic anhydride such as phthalic anhydride, hexahydrophthalic anhydride, tetrahydrophthalic anhydride, dodecenyl succinic anhydride or pyromellitic anhydride; a phenoxy resin; a carboxylic acid; an alcohol; a polyalkylene oxide type polymer having an average of at least one group which may react with an epoxy group, per molecule (such as polyoxypropylene glycol having aminated terminals or polyoxypropylene glycol having carboxylated terminals); or a polymer having liquid-form terminal functional groups, such as a polybutadiene, a hydrogen-added polybutadiene or an acronitrile-butadiene copolymer having its molecular terminals modified by functional groups such as hydroxyl groups, carboxyl groups or amino groups. The amount of the curing agent for the epoxy resin, is preferably from 0.1 to 300 parts by mass, particularly preferably from 1 to 200 parts by mass, per 100 parts by mass of the epoxy resin.

Dehydrating Agent

In order to improve the storage stability of the curable composition of the present invention, it is possible to use a dehydrating agent. The dehydrating agent is preferably used, especially when the curable composition is formed into a one-pack type formulation, i.e. a formulation wherein when it is just taken out of a sealed vessel, the oxyalkylene polymer having hydrolyzable silicon groups becomes cured by moisture in atmosphere. The dehydrating agent may, for example, be an alkyl orthoformate such as methyl orthoformate or ethyl orthoformate; an alkyl orthoacetate such as methyl orthoacetate or ethyl orthoacetate; a hydrolyzable organic silicon compound such as methyl trimethoxysilane, vinyltrimethoxysilane tetramethoxysilane or tetraethoxysilane; or a hydrolyzable organic titanium compound. Among them, vinyltrimethoxysilane or tetraethoxysilane is particularly preferred from the viewpoint of availability and high dehydrating effect.

When the dehydrating agent is added to the curable composition, the amount to be added is preferably from 0 to 30 parts by mass, particularly preferably from 1 to 10 parts by mass, per 100 parts by mass of the oxyalkylene polymer (a) having hydrolyzable silicon groups. If the amount of the dehydrating agent exceeds 30 parts by mass, curing of the curable composition tends to be too slow.

Thixotropy-Imparting Agent

To the curable composition of the present invention, it is possible to add a thixotropy-imparting agent as an anti-sag agent. The thixotropy-imparting agent is not particularly limited, and it may, for example, be a hydrogenated castor oil or an aliphatic amide. When the thixotropy-imparting agent is added to the curable composition, it is possible to properly select the amount that provides desirable anti-sag properties.

Age Resistor

To the curable composition of the present invention, it is possible to add an age resistor to improve weather resistance or light resistance. The age resistor is not particularly limited, and it is possible to use an additive selected from the group consisting of an antioxidant, an ultraviolet absorber or a light stabilizer, which is usually added to e.g. a polyurethane resin. As the age resistor, various age resistors such as a hindered amine type, a benzotriazole type, a benzophenone type, a benzoate type, a cyanoacrylate type, an acrylate type, a hindered phenol type, a phosphoric type and a sulfur type, are known, and it is possible to select a proper compound among them and add it to the curable composition of the present invention.

Other Additives

To the curable composition of the present invention, it is possible to suitably add any desired other additives in addition to the above-described additives. Such other additives in addition to the above-described additives may, for example, be an inorganic pigment such as iron oxide, chrome oxide or titanium oxide, an organic pigment such as phthalocyanine blue or phthalocyanine green, a fungicide, and a foaming agent.

Room-Temperature-Curable Composition

When a mixture of an oxyalkylene polymer (polymer M) having at least one trimethoxysilyl group and an oxyalkylene polymer (polymer E) having at least one triethoxysilyl group, is used, as the oxyalkylene polymer having hydrolyzable silicon groups, the mixing ratio of the polymer M to the polymer E is not particularly limited, but it is preferably the polymer M:the polymer E=95:5 to 5:95, further preferably from 95:5 to 10:90, particularly preferably 70:30 to 20:80, from the viewpoint of adjusting working time or curing time.

Further, when a mixture of an oxyalkylene polymer (polymer R) having at least two types of hydrolyzable silicon groups, per molecule, and an oxyalkylene polymer (polymer S) having one type of at least two hydrolyzable silicon groups, is used, as the oxyalkylene polymer having hydrolyzable silicon groups, the mixing ratio of the polymer R to the polymer S is not particularly limited, but it is preferably the polymer R:the polymer S=95:5 to 5:95, from the viewpoint of adjusting working time or curing time.

When a mixture of a polymer (polymer ME) having a trimethoxysilyl group and a triethoxysilyl group, per molecule, and a polymer (polymer M) having only a trimethoxysilyl group, is used, as the oxyalkylene polymer having hydrolyzable silicon groups, the mixing ratio of the polymer ME to the polymer M is not particularly limited, but it is preferably the polymer ME:the polymer M=100:0 to 5:95, from the viewpoint of adjusting working time or curing time.

When a mixture of a polymer (polymer ME) having a trimethoxysilyl group and a triethoxysilyl group, per molecule, and a polymer (polymer E) having only a triethoxysilyl groups, is used, as the oxyalkylene polymer having hydrolyzable silicon groups, the mixing ratio of the polymer ME to the polymer E is not particularly limited, but it is preferably the polymer ME:the polymer E=100:0 to 5:95, from the viewpoint of adjusting working time or curing time.

EXAMPLES

Now, the curable composition of the present invention will be described in further detail with reference to Examples, but it should be understood that the present invention is by no means restricted thereto.

Here, the weight average molecular weights (Mw), number average molecular weights (Mn) and molecular weight distributions (Mw/Mn) of various polymers in the following Examples and Comparative Examples, are values measured by using Gel permeation chromatography (GPC). Specifically, by using two columns of TSK Multipore HXL-M (manufactured by TOSOH CORPORATION) connected in series, as the column of GPC, and tetrahydrofuran as a mobile phase, measurement was carried out at a temperature of 40° C. Further, Mw, Mn and Mw/Mn values in polystyrene-base molecular weights, were obtained by using a calibration curve made by using a standard polystyrene sample having a known molecular weight (PS-2 manufactured by Polymer Laboratories).

Production Example 1

Production Example 1 of Oxyalkylene Polymer Having Hydrolyzable Silicon Groups

Ring-opening polymerization of propylene glycol with propylene oxide was carried out to obtain a polyoxypropylene diol having a number average molecular weight (Mn)=1,000. The diol was used as an initiator to polymerize the above propylene oxide, in the presence of a zinc hexacyanocobaltate glyme complex catalyst, to obtain a polyoxypropylene diol (polymer P1) having a number average molecular weight (Mn) of 17,000 and a molecular weight distribution (Mw/Mn) of 1.25.

A methanol solution of sodium methoxide corresponding to 1.05 equivalent to hydroxyl groups of the obtained polymer P1, was added. The methanol was distilled by heating under reduced pressure, and terminal hydroxyl groups of the polymer P1 were converted to sodium methoxide. Then, 1.20 equivalent of allyl chloride was added for a reaction. After the reaction, unreacted allyl chloride was removed under reduced pressure, and a by-product salt was removed by further purification, to obtain an oxypropylene polymer having terminal allyl groups (referred to as polymer A1).

The hydroxyl groups remaining in the polymer A1 were analyzed by using a measuring method for hydroxyl value in accordance with JIS K 1557, and the amount of hydroxyl groups was 0.01 mmol/g. To 1,000 g of the above polymer A1, 25.8 g of 3-mercaptopropyltrimethoxysilane and 15 g of methanol having 5.9 g of 2,2'-azobis(2-methylbutyronitrile) (hereinafter referred to as "AMBN") dissolved therein, were added, followed by a reaction by heating at 70° C. for 12 hours to obtain an oxyalkylene polymer (TMS-2) having trimethoxysilyl groups at the terminals of the polymer.

TMS-2 has a number average molecular weight (Mn) of 17,500 and a molecular weight distribution (Mw/Mn) of 1.29.

Production Example 2

Production Example 2 of Oxyalkylene Polymer Having Hydrolyzable Silicon Groups

To 1,000 g of the polymer A1, the total amount of 31.3 g of 3-mercaptopropyltriethoxysilane and 15 g of methanol having 5.9 g of AMBN dissolved therein, was added, followed by a reaction by heating at 70° C. for 12 hours, to obtain an oxyalkylene polymer (TES-2) having triethoxysilyl groups at the terminals of the polymer.

TES-2 has a number average molecular weight (Mn) of 17,500 and a molecular weight distribution (Mw/Mn) of 1.29.

Production Example 3

Production Example 3 of Oxyalkylene Polymer Having Hydrolyzable Silicon Groups

To 1,000 g of the polymer A1, the total amount of 0.3 g of 3-mercaptopropyltrimethoxysilane, 18.7 g of 3-mercaptopropyltriethoxysilane and 15 g of methanol having 5.7 g of AMBN dissolved therein, was added, followed by a reaction by heating at 70° C. for 12 hours, and further dehydration under reduced pressure was carried out to obtain an oxyalkylene polymer (TRS-2) having a trimethoxysilyl groups and a triethoxysilyl group.

TRS-2 has a number average molecular weight (Mn) of 17,500 and a molecular weight distribution (Mw/Mn) of 1.31.

Production Example 4

Production Example 4 of Oxyalkylene Polymer Having Hydrolyzable Silicon Groups

Ring-opening polymerization of glycerol with propylene oxide was carried out to obtain a polyoxypropylene triol having Mn=1,000. The triol was used as an initiator to polymerize the propylene oxide, in the presence of a zinc hexacyanocobaltate glyme complex catalyst, to obtain a polyoxypropylene triol having a number average molecular weight (Mn) of 17,000 and a molecular weight distribution (Mw/Mn) of 1.28.

A methanol solution of sodium methoxide corresponding to 1.05 equivalent to hydroxyl groups of the polyoxypropylene triol, was added. The methanol was distilled by heating under reduced pressure, and terminal hydroxyl groups of the polyoxypropylene triol were converted to sodium methoxide. Then, allyl chloride was added thereto for a reaction. After the reaction, unreacted allyl chloride was removed under reduced pressure, and a by-product salt was removed by purification, to obtain an oxypropylene polymer having terminal allyl groups (referred to as polymer A2).

The hydroxyl groups remaining in the polymer A2 were analyzed by using a measuring method for hydroxyl value in accordance with JIS K 1557, and the amount of hydroxyl groups was 0.01 mmol/g. To 1,000 g of the above polymer A2, the total amount of 42 g of 3-mercaptopropyltrimethoxysilane and 15 g of methanol having 8.2 g of 2,2'-azobis(2-methylbutyronitrile) dissolved therein, was added, followed by a reaction by heating at 70° C. for 12 hours, and further dehydration under reduced pressure was carried out to obtain an oxyalkylene polymer (TMS-P) having trimethoxysilyl groups. TMS-P has a number average molecular weight (Mn) of 17,800 and a molecular weight distribution (Mw/Mn) of 1.29.

Production Example 5

The polymer P1 produced in Production Example 1, was dehydrated in a flask, and then, 30 ppm of dibutyltin dilaurate was added. The mixture was stirred for 10 minutes in an oil bath at a temperature of 50° C., and then, 3-isocyanatepropyltrimethoxysilane was added in an amount of 1 equivalent to hydroxyl groups of the polymer Pi, followed by a reaction at 80° C. for 10 hours. The infrared absorption spectrum was measured, to confirm that there was no peak derived from an isocyanate, and a polymer TMU-2 was obtained.

Production Example 6

A polymer TEU-2 was obtained in the same manner as in Production Example 5, except that 3-isocyanatepropyltrimethoxysilane was changed to 3-isocyanatepropyltriethoxysilane.

Production Method of Room-Temperature-Curable Compositions

TMS-2, TES-2, TRS-2, TMS-P, TMU-2, and TEU-2, which were obtained in the above Production Examples 1 to 6 were used alone or in combination, in proportions shown in Tables 1 and 2. To 100 parts by mass in total of the polymers, 20 parts by mass of heavy calcium carbonate (trade name: NS-400, manufacture by NITTO FUNKA KOGYO) and 30 parts by mass of surface-treated calcium carbonate (trade name: HAKUENKA CCR, manufactured by SHIRAISHI CALCIUM KAISYA, LTD.) were added, followed by stirring and mixing by using a planetary stirrer (manufactured by KURABO INDUSTRIES LTD). After the temperature of the obtained mixed compound was lowered to room temperature, parts by mass of vinyltrimethoxysilane (trade name: KBM-1003, manufactured by Shin-Etsu Chemical Co., Ltd.) was added as a dehydrating agent, followed by stirring and mixing, and then, 3 parts by mass of N-(2-aminoethyl)-3-aminopropyltrimethoxysilane (trade name: KBM-603, manufactured by Shin-Etsu Chemical Co., Ltd.) and 1 part by mass of 3-glycidyloxypropyltrimethoxysilane (KBM-403, manufactured by Shin-Etsu Chemical Co., Ltd.) were added as adhesion-promoting agents, followed by stirring and mixing. Lastly, 2 parts by mass of bis(dibutyltin monoacetate) oxide was added as a curing catalyst, followed by stirring and mixing, to obtain a room-temperature-curable composition containing a combination of respective polymers.

Measurements of Physical Properties and Curing Rate
Tensile Shear Strength

In accordance with JIS K 6850, by using each of the above room-temperature-curable compositions and an aluminum specimen having 100 mm in length×25 mm in width, the curable composition was applied on the specimen so that the coated surface would be 25 mm in length×25 mm in width×1 mm in thickness, to obtain a specimen for measuring physical properties. Each specimen was cured and aged under conditions of 23° C. and a humidity of 50% for 3 days, and then, after a spacer was removed, each specimen was further aged under conditions of 50° C. and a humidity of 65% for 6 days. Each specimen was taken out of the aging device and left to stand under conditions of 23° C. and a humidity of 50% for at least 24 hours, followed by a tensile shear strength test by using a tensilon. Measurements were carried out with a tensile rate of 50 mm/min and in accordance with JIS K 6850. The maximum tensile stress (Tmax(N/mm$^2$)) and the elongation at the maximum stress (E(mm)) of each specimen are shown in Tables 1 and 2.

Curing Properties

TMS-2, TES-2, TRS-2, TMS-P, TMU-2, and TEU-2, which were obtained in the above Production Examples 1 to 6 were used alone or in combination, in proportions shown in Tables 1 and 2. To 100 parts by mass in total of the polymers, 2 parts by mass of bis(dibutyltin monoacetate) was added as a curing catalyst, followed by mixing and stirring. From the start time of stirring as 0 minute, the period of time until the room-temperature-curable composition becomes a gel-form, was taken as working time (minute), and the period of time until each room-temperature-curable composition stops sticking to a spatula, was taken as curing time (minute), as shown in Tables 1 and 2. Such curing time is slightly longer than the working time of the curable composition, and it serves as an index for the working time. The longer the curing time, the longer the working time.

TABLE 1

|  | Ex. 1 | Ex. 2 | Ex. 3 | Ex. 4 | Ex. 5 |
|---|---|---|---|---|---|
| TMS-2 | 0 | 70 | 50 | 40 | 20 |
| TES-2 | 0 | 30 | 50 | 60 | 80 |
| TRS-2 | 100 | 0 | 0 | 0 | 0 |
| TMS-P | 0 | 0 | 0 | 0 | 0 |
| Tmax (N/mm$^2$) | 1.50 | 1.41 | 1.49 | 1.50 | 1.49 |
| E (mm) | 4.2 | 3.6 | 4.1 | 4.0 | 4.5 |
| Curability: |  |  |  |  |  |
| Working time (min.) | 19 | 16 | 17 | 19 | 23 |
| Curing time (min.) | 23 | 21 | 22 | 24 | 27 |

TABLE 2

|  | Ex. 6 | Ex. 7 | Comp. Ex. 1 | Comp. Ex. 2 |
|---|---|---|---|---|
| TMS-2 | 30 | 0 | 100 | 0 |
| TES-2 | 30 | 0 | 0 | 0 |
| TRS-2 | 40 | 0 | 0 | 0 |
| TMS-P | 0 | 0 | 0 | 100 |
| TMU-2 | 0 | 50 | 0 | 0 |
| TEU-2 | 0 | 50 | 0 | 0 |
| Tmax (N/mm$^2$) | 1.49 | 1.66 | 1.32 | 1.32 |
| E (mm) | 4.1 | 3.8 | 3.6 | 2.5 |
| Curability: |  |  |  |  |
| Working time (min.) | 18 | 16 | 15 | 7 |
| Curing time (min.) | 23 | 21 | 20 | 8.5 |

As shown in Tables 1 and 2, the curable compositions of Examples 1 to 7 have higher tensile shear strengths (N/mm$^2$) and higher elongations at the maximum stress (E (mm)), as compared with the curable composition in Comparative Example 1.

The working times and curing times of Examples 1 to 7 are long as compared with Comparative Examples 1 and 2, whereby it was possible to secure a necessary operation time for adhesion to an adherend. The room-temperature-curable composition of the present invention was able to secure long working time for curing and to obtain, even after curing, suitable adhesion strength against peeling and sufficient elongation properties of a cured product, while maintaining the shear strength.

INDUSTRIAL APPLICABILITY

The room-temperature-curable composition of the present invention has ensured working time and curing rate required for operation, and has excellent elongation properties of a cured product after curing. By using such characteristics, the curable composition of the present invention may be used in fields of a covering composition and a sealing composition, such as a sealant, a waterproof material, an adhesive or a coating agent.

The entire disclosure of Japanese Patent Application No. 2005-365764 filed on Dec. 20, 2005 including specification, claims and summary is incorporated herein by reference in its entirety.

What is claimed is:

1. A room-temperature-curable composition comprising a polymer (a2), a polymer (a3) and a curing catalyst (b), wherein the polymer (a2) is a linear oxyalkylene polymer having one type of at least one hydrolyzable silicon group of the formula (I), at molecular terminals, and the polymer (a3) is a linear oxyalkylene polymer having at least one hydrolyzable silicon group of the formula (I), which is different in type from the group of the polymer (a2), at molecular terminals:

$$—Si(OR)_3 \quad (1)$$

wherein each R independently represents a $C_{1-6}$ organic group, and wherein the ratio of (a2) to (a3) is 95:5 to 5:95.

2. The room-temperature-curable composition as defined in claim 1, wherein the hydrolyzable silicon groups are a trimethoxysilyl group and a trialkoxysilyl group having a $C_{2-6}$ alkoxy group, wherein the ratio of the trimethoxysilyl group to the trialkoxysilyl group having a $C_{2-6}$ alkoxy group is 95:5 to 5:95.

3. The room-temperature-curable composition according to claim 1, wherein the polymer (a2) and the polymer (a3) are polymers obtained by using, as a raw material, a polyoxyalkylene diol obtained by ring-opening polymerization of a cyclic ether by means of a double metal cyanide complex catalyst in the presence of a bifunctional initiator, and by introducing hydrolizable silicon groups to molecular terminals of the diol.

4. The room-temperature-curable composition according to claim 1, wherein the polymer (a2) and the polymer (a3) have a number average molecular weight (Mn) of from 8,000 to 50,000 and a molecular weight distribution (Mw/Mn) of at most 1.6.

5. The room-temperature-curable composition according to claim 1, which comprises the polymer (a2), the polymer (a3), a filler, an adhesion-promoting agent and a plasticizer.

6. The room-temperature-curable composition according to claim 2, wherein the trialkoxysilyl group having a $C_{2-6}$ alkoxy group is a triethoxysilyl group.

7. The room-temperature-curable composition according to claim 1, wherein the ratio of a polymer (a2) having at least one different hydrolysable group, per molecule, to a polymer (a3) having one type of hydrolysable group, per molecule, is 95:5 to 5:95.

8. The room-temperature-curable composition according to claim 2, wherein the ratio of the trimethoxysilyl group to the trialkoxysilyl group having a $C_{2-6}$ alkoxy group is 95:5 to 10:90.

9. The room-temperature-curable composition according to claim 2, wherein the ratio of the trimethoxysilyl group to the trialkoxysilyl group having a $C_{2-6}$ alkoxy group is 70:30 to 20:80.

10. The room-temperature-curable composition according to claim 1, wherein the polymer (a2) and the polymer (a3) have a number average molecular weight (Mn) of from 12,000 to 20,000.

11. The room-temperature-curable composition according to claim 2, wherein the polymer (a2) and the polymer (a3) have a number average molecular weight (Mn) of from 12,000 to 20,000.

12. The room-temperature-curable composition according to claim 3, wherein the polymer (a2) and the polymer (a3) have a number average molecular weight (Mn) of from 12,000 to 20,000.

13. The room-temperature-curable composition according to claim 1, wherein the polymer (a2) and the polymer (a3) have a molecular weight distribution (Mw/Mn) of at most 1.6.

14. The room-temperature-curable composition according to claim 1, wherein the polymer (a2) and the polymer (a3) have a molecular weight distribution (Mw/Mn) of at most 1.5.

15. The room-temperature-curable composition according to claim 1, wherein the polymer (a2) and the polymer (a3) have a molecular weight distribution (Mw/Mn) of at most 1.4.

16. A method of making a cured product, comprising curing the composition of claim 1.

17. A cured product obtain by the method of claim 16.

18. The cured product of claim 16, which has an elongation at maximum stress of 3.6 to 4.5 mm.

19. The cured product of claim 15, which has a tensile shear strength of 1.41 to 1.66 N/mm².

20. The room-temperature-curable composition as defined in claim 1, which consists essentially of the polymer (a2), a polymer (a3) and curing catalyst (b).

21. The room-temperature-curable composition as defined in claim 20, further comprising at least one additive selected from the group consisting of an adhesion promoting agent, a plasticizer, a dehydrating agent, a filler, an age resistor and a coloring agent.

22. A room-temperature-curable composition, comprising:
a polymer (a2), wherein the polymer (a2) is a room-temperature curable linear oxyalkylene polymer having one type of at least one hydrolyzable silicon group of the formula (I) at the molecular terminals thereof,
a polymer (a3), wherein the polymer (a3) is a room-temperature curable linear oxyalkylene polymer having at least one hydrolyzable silicon group of the formula (I), which is different from the hydrolyzable silicon group of the polymer (a2), at the molecular terminals thereof, and
a curing catalyst (b), $$—Si(OR)_3 \quad (1)$$

wherein
each R independently represents a $C_{1-6}$ organic group, and the polymer (a2) and the polymer (a3) are the sole curable polymers in the composition.

23. The composition of claim 22, wherein the ratio of polymer (a2) to polymer (a3) is 95:5 to 5:95.

* * * * *